(12) United States Patent
Sankarram et al.

(10) Patent No.: US 10,534,646 B2
(45) Date of Patent: Jan. 14, 2020

(54) MEMORY MANAGEMENT FOR APPLICATIONS OPERATING ON JAVA VIRTUAL MACHINES

(71) Applicant: SAP SE, Walldorf (DE)

(72) Inventors: Chandrasekar Sankarram, San Jose, CA (US); Yukching Leung, Palo Alto, CA (US)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 15/591,056

(22) Filed: May 9, 2017

(65) Prior Publication Data

US 2018/0329748 A1    Nov. 15, 2018

(51) Int. Cl.
*G06F 9/50*    (2006.01)
*G06F 9/455*    (2018.01)

(52) U.S. Cl.
CPC ........ *G06F 9/5016* (2013.01); *G06F 9/45504* (2013.01); *G06F 9/5077* (2013.01)

(58) Field of Classification Search
CPC ...... G06F 9/45533; G06F 9/52; G06F 9/5077; G06F 9/45504; G06F 9/5016
USPC .................................................... 718/1, 104
See application file for complete search history.

(56) References Cited

U.S. PATENT DOCUMENTS

| | | | | |
|---|---|---|---|---|
| 8,938,643 B1* | 1/2015 | Karmarkar | .......... | G06F 11/1658 714/11 |
| 9,122,780 B2* | 9/2015 | Natu | .................. | G06F 9/45558 |
| 9,836,402 B1* | 12/2017 | Riel | .................... | G06F 12/0868 |
| 2008/0301673 A1* | 12/2008 | Kawasaki | .......... | G06F 9/45516 718/1 |
| 2009/0307432 A1* | 12/2009 | Fleming | ................ | G06F 12/023 711/135 |
| 2012/0137101 A1* | 5/2012 | Arcese | .................. | G06F 9/5016 711/170 |
| 2014/0047190 A1* | 2/2014 | Dawkins | ............. | G06F 12/0813 711/136 |
| 2016/0170791 A1* | 6/2016 | Huh | ..................... | G06F 9/45558 718/1 |
| 2017/0139742 A1* | 5/2017 | Cropper | ................ | G06F 9/4856 |

\* cited by examiner

*Primary Examiner* — Phillip H Nguyen
(74) *Attorney, Agent, or Firm* — Lam P. Doan; Fountainhead Law Group PC

(57) ABSTRACT

Some embodiments provide a non-transitory machine-readable medium that stores a program. The program receives a notification from a java virtual machine indicating that an amount of free memory associated with the java virtual machine is less than a first threshold amount of memory. In response to the notification, the program further transitions from operating in a non-low-memory stat to operating a low-memory state. The low-memory state includes decreasing an amount of memory used by a set of components in a plurality of components of an application operating on the java virtual machine in order to increase the amount of free memory associated with the java virtual machine. The program also determines that the amount of free memory associated with the java virtual machine is greater than a second threshold amount of memory. In response to the determination, the program further transitions from operating in the low-memory state to operating in the non-low-memory state.

20 Claims, 10 Drawing Sheets

MEMORY MANAGEMENT FOR APPLICATIONS OPERATING ON JAVA VIRTUAL MACHINES

BACKGROUND

Many different computer programming languages may be used to create software programs for execution on computing devices. One such programming language that may be used is Java. When a Java programming language is used to create a software program, a Java compiler is used to convert Java source code of the software program into an intermediate language known as Java bytecode. In this intermediate language, a software program may be executed on any computing device through the use of a Java virtual machine (JVM). Typically, a JVM running on a computing device may be include a just-in-time (JIT) compiler that may be used to convert the intermediate Java bytecode into native machine code that is configured to run on the computing device.

SUMMARY

In some embodiments, a non-transitory machine-readable medium stores a program. The program receives a notification from a java virtual machine indicating that an amount of free memory associated with the java virtual machine is less than a first threshold amount of memory. In response to the notification, the program further transitions from operating in a non-low-memory stat to operating a low-memory state. The low-memory state includes decreasing an amount of memory used by a set of components in a plurality of components of an application operating on the java virtual machine in order to increase the amount of free memory associated with the java virtual machine. The program also determines that the amount of free memory associated with the java virtual machine is greater than a second threshold amount of memory. In response to the determination, the program further transitions from operating in the low-memory state to operating in the non-low-memory state.

In some embodiments, the program may further send the java virtual machine a request to receive the notification when the java virtual machine detects that amount of free memory associated with the java virtual machine is less than the first threshold amount of memory. Decreasing the amount of memory used by the set of components may include writing data stored in memory used by the set of components to a non-memory storage and returning the memory used by the set of components to the java virtual machine. Transitioning from operating in the low-memory state to operating in the non-low-memory state may include requesting free memory from the java virtual machine, retrieving the data stored in the non-memory storage, and writing the data to the requested free memory.

In some embodiments, the low-memory state may further include periodically polling the java virtual machine for the amount of free memory associated with the java virtual machine. Operating in the non-low-memory state may include sending the java virtual machine requests for free memory for the plurality of components to use to store data. The second threshold amount may be based on the first threshold amount.

In some embodiments, a method receives a notification from a java virtual machine indicating that an amount of free memory associated with the java virtual machine is less than a first threshold amount of memory. In response to the notification, the method further transitions from operating in a non-low-memory stat to operating a low-memory state. The low-memory state includes decreasing an amount of memory used by a set of components in a plurality of components of an application operating on the java virtual machine in order to increase the amount of free memory associated with the java virtual machine. The method also determines that the amount of free memory associated with the java virtual machine is greater than a second threshold amount of memory. In response to the determination, the method further transitions from operating in the low-memory state to operating in the non-low-memory state.

In some embodiments, the method may further send the java virtual machine a request to receive the notification when the java virtual machine detects that amount of free memory associated with the java virtual machine is less than the first threshold amount of memory. Decreasing the amount of memory used by the set of components may include writing data stored in memory used by the set of components to a non-memory storage and returning the memory used by the set of components to the java virtual machine. Transitioning from operating in the low-memory state to operating in the non-low-memory state may include requesting free memory from the java virtual machine, retrieving the data stored in the non-memory storage, and writing the data to the requested free memory.

In some embodiments, the low-memory state may further include periodically polling the java virtual machine for the amount of free memory associated with the java virtual machine. Operating in the non-low-memory state may include sending the java virtual machine requests for free memory for the plurality of components to use to store data. The second threshold amount may be based on the first threshold amount.

In some embodiments, a system includes a set of processing units and a non-transitory computer-readable medium that stores instructions. The instructions cause at least one processing unit to receive a notification from a java virtual machine indicating that an amount of free memory associated with the java virtual machine is less than a first threshold amount of memory. In response to the notification, the instructions further cause the at least one processing unit to transition from operating in a non-low-memory stat to operating a low-memory state. The low-memory state includes decreasing an amount of memory used by a set of components in a plurality of components of an application operating on the java virtual machine in order to increase the amount of free memory associated with the java virtual machine. The instructions also cause the at least one processing unit to determine that the amount of free memory associated with the java virtual machine is greater than a second threshold amount of memory. In response to the determination, the instructions further cause the at least one processing unit to transition from operating in the low-memory state to operating in the non-low-memory state.

In some embodiments, the instructions further cause the at least one processing unit to send the java virtual machine a request to receive the notification when the java virtual machine detects that amount of free memory associated with the java virtual machine is less than the first threshold amount of memory. Decreasing the amount of memory used by the set of components may include writing data stored in memory used by the set of components to a non-memory storage and returning the memory used by the set of components to the java virtual machine. Transitioning from operating in the low-memory state to operating in the non-low-memory state may include requesting free memory from the java virtual machine, retrieving the data stored in the non-memory storage, and writing the data to the requested free memory.

In some embodiments, the low-memory state may further include periodically polling the java virtual machine for the amount of free memory associated with the java virtual machine. Operating in the non-low-memory state may include sending the java virtual machine requests for free memory for the plurality of components to use to store data.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for managing memory usage by an application operating on a Java virtual machine (JVM). In some embodiments, the application includes several different components used to implement features and/or functionalities of the application. The application may request the JVM on which the application is operating to notify the application when the amount of free memory of the JVM drops below a first defined threshold amount. In response to such a notification, the application may transition from a non-low-memory state to a low-memory state in which certain components of the application reduce the amount of memory usage, thereby increasing the amount of free memory of the JVM. Once the amount of free memory of the JVM increases above a second defined threshold amount, the application may transition to a non-low-memory state. In this manner, the JVM is prevented from failing due to low-memory conditions.

Figure 1:
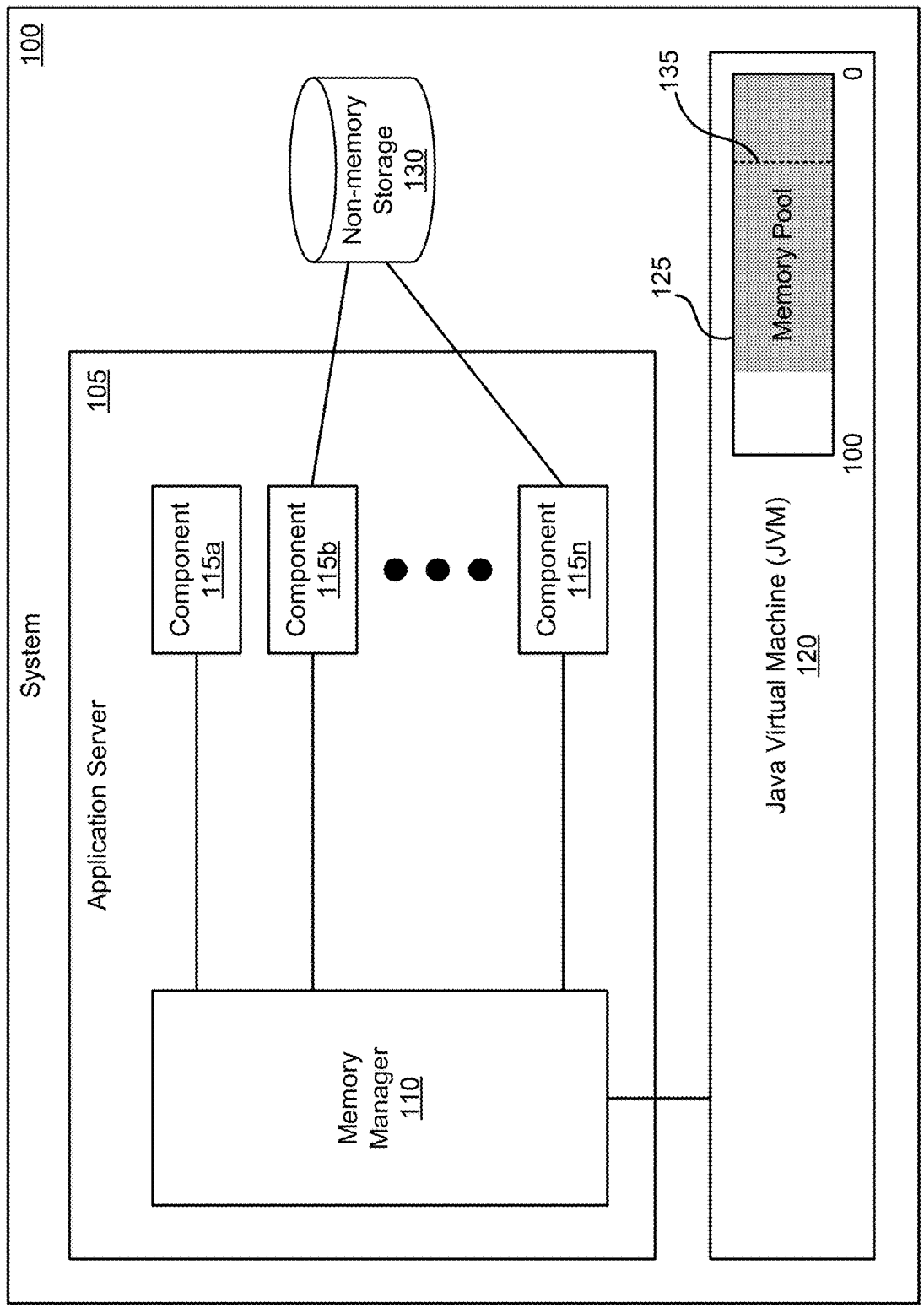
FIG. 1 illustrates a system for managing memory for an application operating on a Java virtual machine according to some embodiments.

FIG. 1 illustrates a system 100 for managing memory for an application operating on a Java virtual machine according to some embodiments. As shown, system 100 includes application server 105, Java virtual machine (JVM) 120, and non-memory storage 130. Non-memory storage 130 may be implemented using a non-memory-based medium (e.g., a secondary storage medium such as magnetic disk storage (e.g., a hard disk drive), a Zip drive, a solid-state drive (SSD), a flash memory card (e.g., a secure digital (SD) card, a CompactFlash card, etc.), a USB flash drive, or any other type of computer-readable storage media or device, etc.) and configured to store data for system 100.

Application server 105 is software application/program written using a Java programming language and compiled into an intermediate language (e.g., Java bytecode). The intermediate language representation of application server 105 may be configured to run on JVM 120. As illustrated, application server 105 includes memory manager 110 and components 115a-n.

Memory manager 110 may be configured to determine different operating states of application server 105. For instance, memory manager 110 may determine whether application server 105 is to operate in a non-low-memory state or a low-memory state. In some embodiments, upon initialization of application server 105, memory manager 110 determines that application server 105 is to operate in the non-low-memory state and sends JVM 120 a request to notify memory manager 110 when the amount of free memory managed by JVM 120 decreases below a first defined threshold amount (also referred to as a low-memory threshold amount). Upon receiving such a notification from JVM 120, memory manager 110 determines that application server 105 is to operate in the low-memory state. While application server 105 is operating in the low-memory state, memory manager 110 periodically polls JVM 120 for the amount of free memory managed by JVM 120. When the amount of free memory managed by JVM 120 increases above a second defined threshold amount (also referred to as a recovery threshold amount), memory manager 110 determines that application server 105 is to operate in the non-low-memory state. In some embodiments, the recover threshold amount is a defined percentage (e.g., five percent, ten percent, etc.) of the low-memory threshold amount greater than the low-memory threshold amount. In other embodiments, the recover threshold amount is a defined amount of memory (e.g., 500 megabytes (MB), one gigabyte (GB), etc.) greater than the low-memory threshold amount.

Memory manage 110 can receive requests from one or more components 115a-n to receive notifications of changes to the operating state of application server 105. For example, when memory manager 110 determines that application server 105 is to operate in the low-memory state (e.g., memory manager 110 receives a notification from JVM 120 that the amount of free memory managed by JVM 120 has decreased below a low-memory threshold amount), memory manager 110 may send a notification to components 115a-n that application server 105 is operating in the low-memory state. Similarly, when memory manager 110 determines that application server 105 is to operate in the non-low-memory state (e.g., upon initialization of application server 105, upon the amount of free memory managed by JVM 120 increasing above a recovery threshold amount, etc.), memory manager 110 may send a notification to components 115a-n that application server 105 is operating in the non-low-memory state.

Components 115a-n are software components that are each configured to perform a defined set of operations and/or functions in order to implement features and/or functionalities of the application. For instance, when a component 115 needs memory, the components 115 may send JVM 120 a request for free memory and then use the memory received from JVM 120 accordingly. Examples of such software components include a queue component, a registry component, a cache management component, third-party libraries, etc.

One or more components 115a-n may request memory manager 110 for notifications of changes to the operating state of application server 105. When such a component 115 receives a notification from memory manager 110 that the application server 105 is operating in the non-low-memory state, the component 115 performs its defined set of operations and/or functions (e.g., requesting JVM 120 for memory, storing data in such memory, modifying data in such memory, deleting data from such memory, etc.). When the component 115 receives a notification from memory manager 110 that the application server 105 is operating in the low-memory state, the component 115 starts reducing consumption of memory. In some embodiments, such a component 115 can reduce consumption of memory by writing data stored in memory used by the component 115 to non-memory storage 130 and then returning the memory to JVM 120. While application server 105 is operating in the low-memory state and the component 115 receives a notification from memory manager 110 that the application server 105 transitioned from operating in the low-memory state to operating in the non-low-memory state, such a component 115 may perform a set of recovery operations before resuming to perform its defined set of operations and/or functions in the non-low-memory state. In some embodiments, the set of recovery operations include sending JVM 120 a request for free memory and then writing the data stored in non-memory storage 130 during the low-memory state in the memory received from JVM 120. Component 115a-n that do not request memory manager 110 to notify them of changes to the operating state of application server 105 continue to perform their defined set of operations and/or functions regardless of the state in which application server 105 is operating. That is, these components 115a-n perform their defined set of operations and/or functions while the application server 105 is operating in the non-low-memory state, the low-memory state, etc.

As illustrated in FIG. 1, JVM 120 includes memory pool 125. Memory pool 125 includes memory allocated from the memory of system 100 (not shown) (e.g., upon initialization of JVM 120). JVM 120 is configured to manage memory pool 125. For example, JVM 120 may receive requests from components 115a-n for free memory. In response to such a request, JVM 120 allocates free memory from memory pool 125, which reduces the amount of free memory in memory pool 125 by the amount of allocated free memory, and sends the memory to the requesting component 115. JVM may also receive memory from a component 115 that the component 115 no longer uses and returns the memory to memory pool 125 as free memory, which increases the amount of free memory in memory pool 125 by the amount of memory received from the component 115.

JVM 120 also handles the monitoring of memory in memory pool 125. For instance, JVM 120 may receive from memory manager 110 a request to notify memory manager 110 when the amount of free memory decreases below a specified threshold amount. In response to such a request, JVM 120 monitors the amount of free memory (e.g., by periodically polling the amount of free memory in memory pool 125). When JVM 120 detects the amount of free memory in memory pool 125 decreases below the specified threshold amount, JVM 120 sends a notification to memory manager 110 indicating so. JVM 120 can also receive from memory manager 110 requests for the amount of free. In response to such a request, JVM 120 checks the amount of free memory in memory pool 125 and sends memory manager 110 a response indicating the amount.

An example operation of management memory for application server 105 will now be described by reference to FIGS. 1-5. For this example operation, application server 105 has just been initialized and it running on JVM 120. In addition, component 115b and component 115n has requested memory manager 110 to notify them of changes to the operating state of application server 105. Also, memory manager 110 has requested JVM 120 to notify memory manager 110 when the amount of free memory in memory pool 125 decreases below threshold amount 135.

Figure 2:
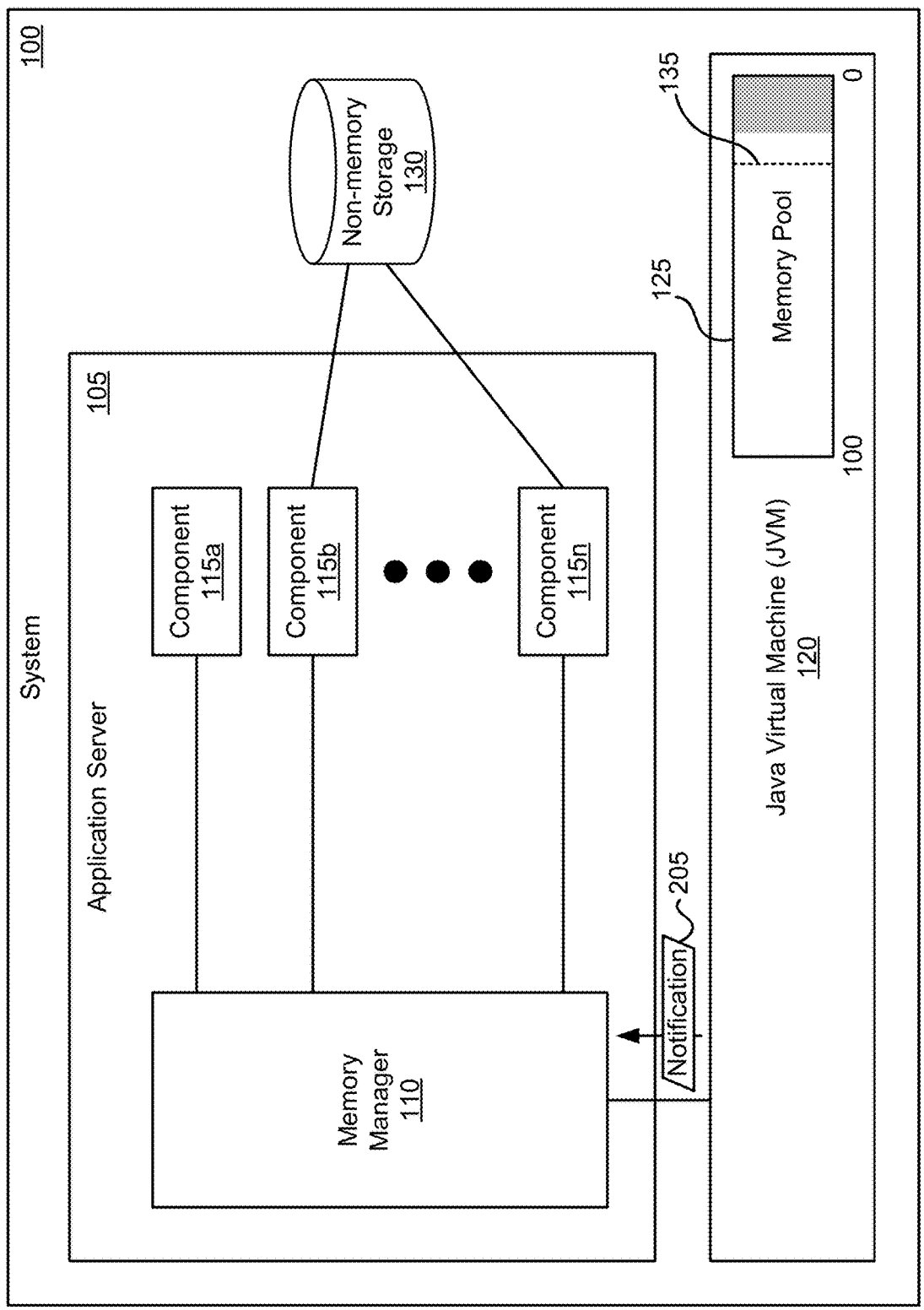
FIGS. 2-6 illustrate a dataflow of an example memory management operation through the system illustrated in FIG. 1 according to some embodiments.

The example operation starts at FIG. 1. Here, operation application server 105 is operating in the non-low-memory state. As shown in FIG. 1, the amount of free memory in memory pool 125 is above threshold amount 135, which is indicated by a grey portion of memory pool 125. During operation in the non-low-memory state, components 115a-n may request free memory from JVM 120, which JVM 120 allocates from memory pool 125. FIG. 2 illustrates system 100 after one or more components 115a-n requested free memory from JVM 120 to perform their defined operations and/or functions. In this example, the requests of components 115a-n for free memory has caused the amount of free memory in memory pool 125 has dropped below threshold amount 135. In response to detecting that the amount of free memory in memory pool 125 has dropped below threshold amount 135, JVM 120 sends memory manager 110 notification 205 indicating so, as shown in FIG. 2.

Figure 3:
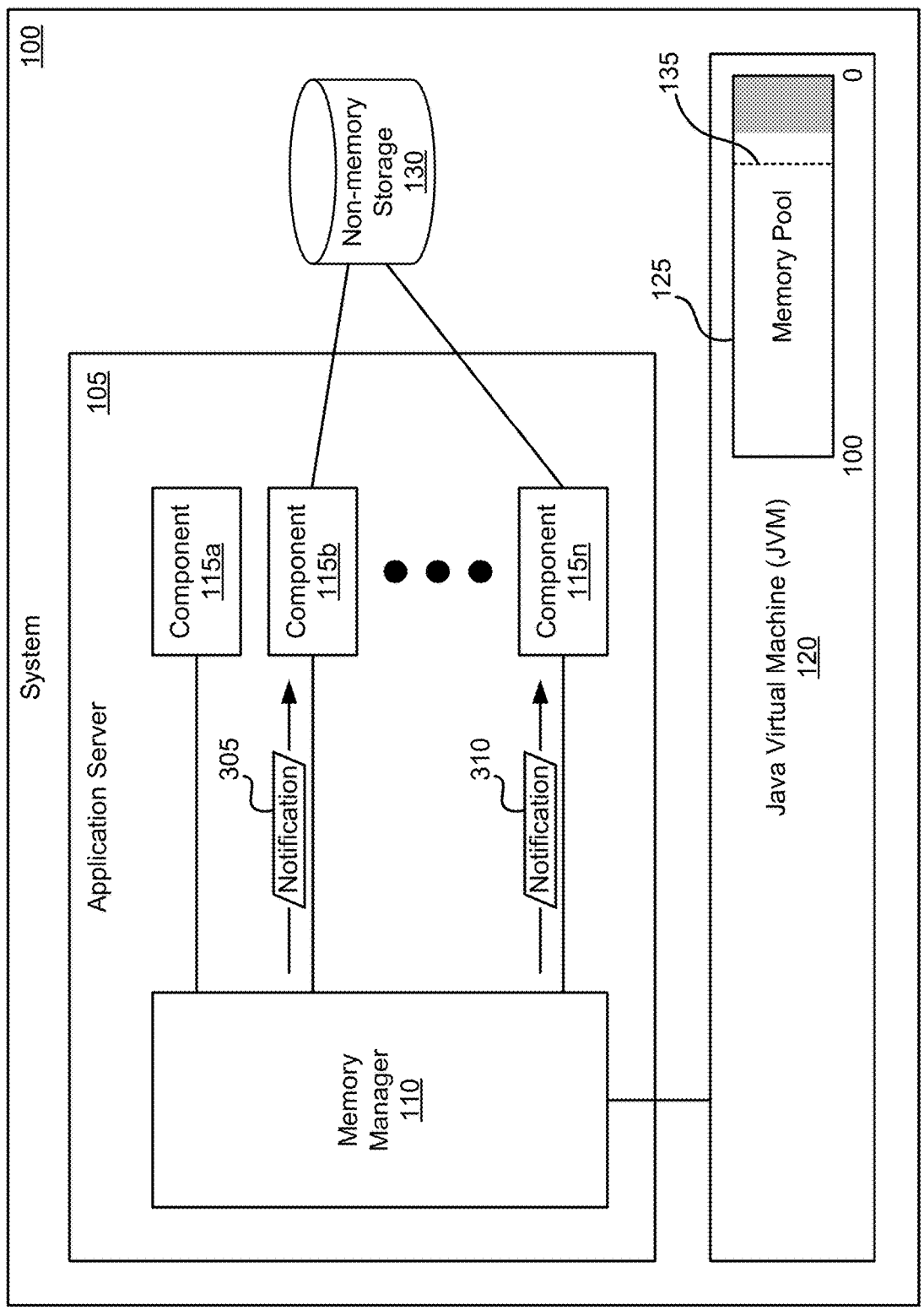

Upon receiving notification 205, memory manager 110 determines that application server 105 is to operate in the low-memory state. In response to such a determination, memory manager 110 determines a subset of components 115a-n that have requested to be notifies of changes to the operating state of application 105 and sends the subset of components 115a-n notifications indicating that the operating state of application server 105 is the low-memory state. FIG. 3 illustrates memory manager 110 sending notifications to the subset of components 115a-n. As mentioned above, for this example, components 115b and 115n have requested memory manager 110 to notify them of changes to the operating state of application server 105. Accordingly, as shown in FIG. 3, memory manager 110 is sending notifications 305 and 310 to components 115b and 115n, respectively.

Figure 4:
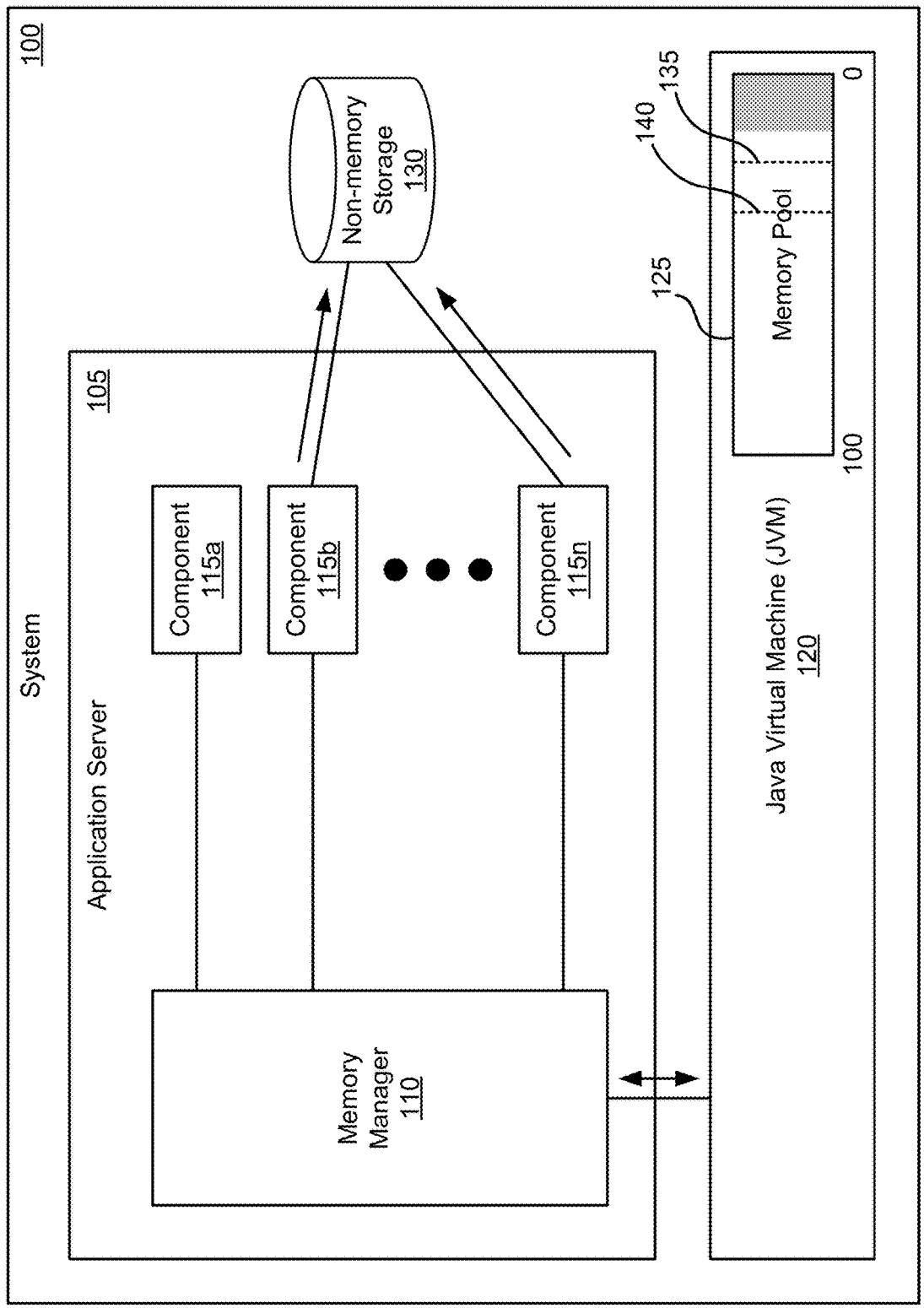

In response to the notifications from memory manager 110, the subset of components 115a-n transitions from operating in the non-low-memory state to operating in the low-memory state. FIG. 4 also illustrates the subset of components 115a-n operating in the low-memory state. Specifically, in this example, component 115b and component 115n are writing data stored in memory to non-memory storage 130, as illustrated in FIG. 4. As components 115b and 115n write data from memory to non-memory storage 130, components 115b and 115n return the memory to JVM 120.

After sending notifications to the subset of components 115a-n, memory manager 110 periodically sends JVM 120 a request for the amount of free memory. In response to such a request, JVM 120 determines the amount of free memory in memory pool 125 and returns the amount to memory manager 110. FIG. 4 illustrates memory manager 110 polling JVM 120 for the amount of free memory. When the amount of free memory increases above threshold amount 140, memory manager 110 stops requesting JVM 120 for the amount of free memory and determines that application server 105 is to operate in the non-low-memory state. In response to such a determination, memory manager 110 determines a subset of components 115a-n that have requested to be notifies of changes to the operating state of application 105 and sends the subset of components 115a-n notifications indicating that the operating state of application server 105 is the non-low-memory state.

Figure 5:
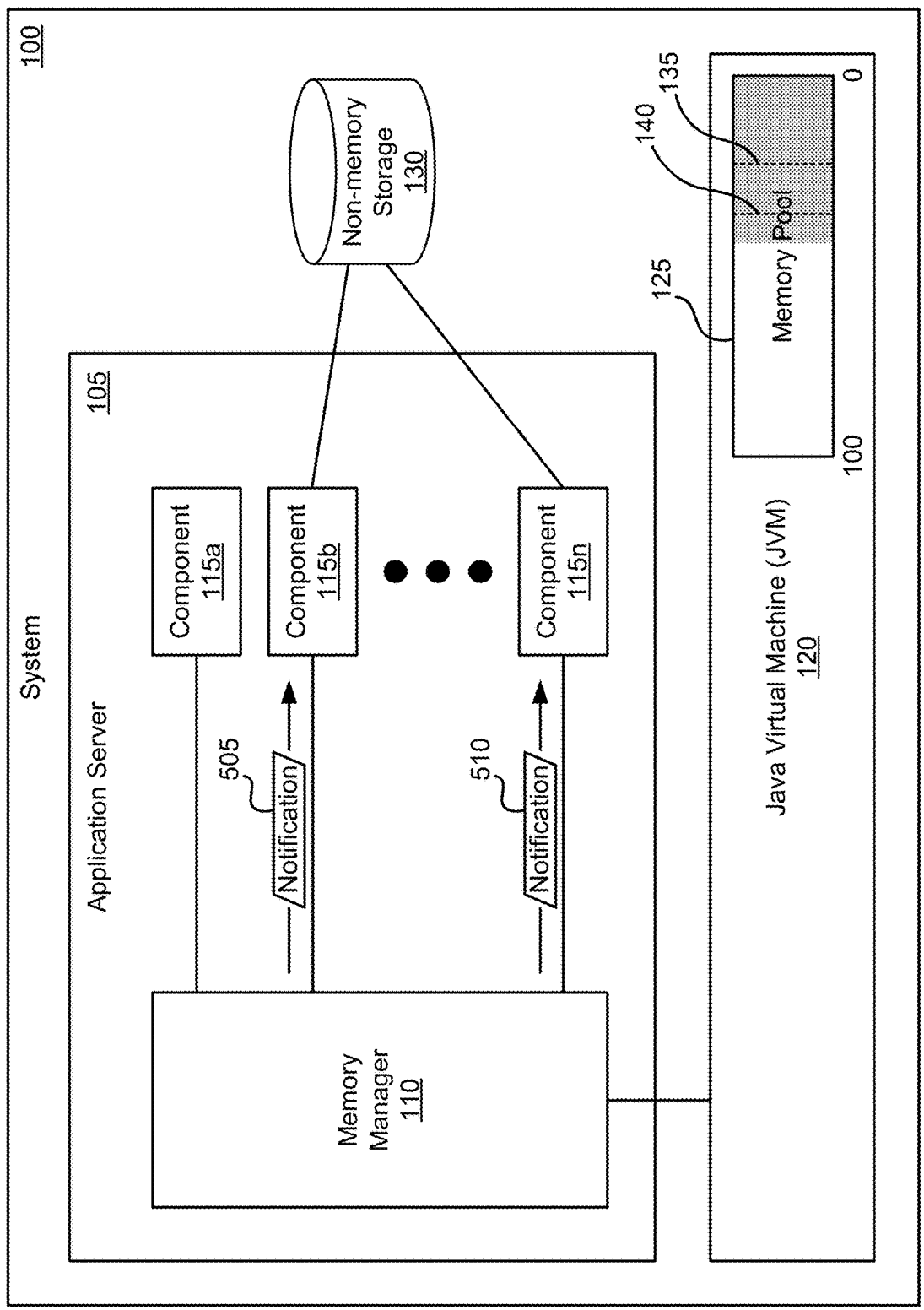

FIG. 5 illustrates memory manager 110 sending notifications to the subset of components 115a-n in response to the amount of free memory increasing above the recovery threshold amount. As shown in FIG. 5, the amount of free memory increased above threshold amount 140. As described above, in this example, components 115b and 115n have requested memory manager 110 to notify them of changes to the operating state of application server 105. Accordingly, as illustrated in FIG. 5, memory manager 110 is sending notifications 505 and 510 to components 115b and 115n, respectively, indicating that the operating state of application server 105 is the non-low-memory state.

In response to the notifications from memory manager 110, the subset of components 115a-n transitions from operating in the low-memory state to operating in the non-low-memory state. In some embodiments, the subset of components 115a-n transitions from operating in the low-memory state to operating in the non-low-memory state by performing a set of recovery operations before resuming to perform their defined set of operations and/or functions in the non-low-memory state. For instance, the subset of components 115a-n may send, as part of the set of recovery operations, JVM 120 a request for free memory and then write the data stored in non-memory storage 130 during the low-memory state in the memory received from JVM 120.

Figure 6:
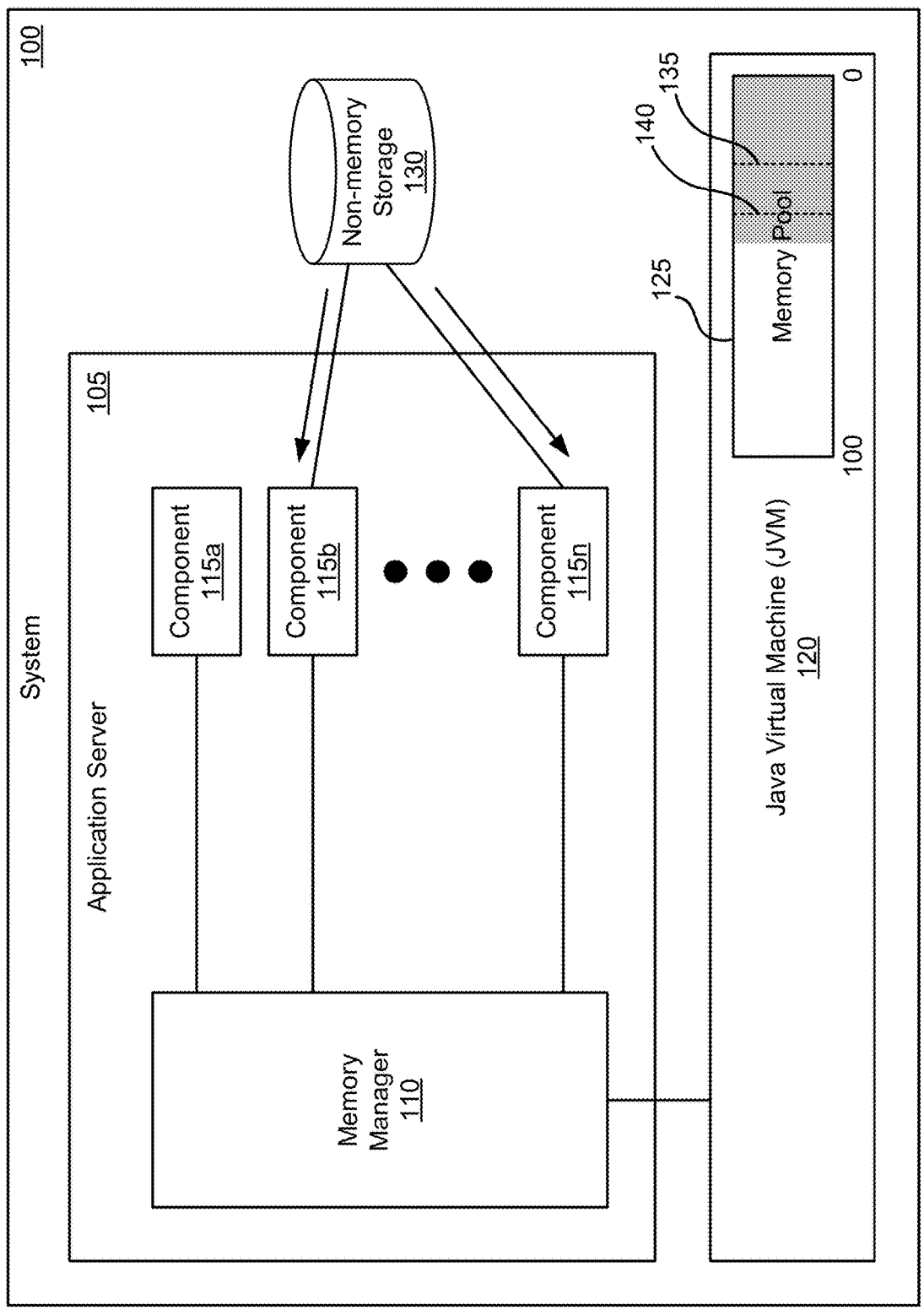

FIG. 6 illustrates the subset of components 115a-n performing recovery operations as part of the transition from operating in the low-memory state to operating in the non-low-memory state. In particular, FIG. 6 illustrates components 115b and 115n retrieving data from non-memory storage 130 that components 115b and 115n had written to non-memory storage 130 in FIG. 4. Components 115b and 115n can then store the retrieved data in free memory requested from JVM 120.

FIGS. 1-6 illustrate one application server running on a JVM, which is running on a system. One of ordinary skill in the art will appreciate that a system may have any number of application servers, each running on its own JVM, and the JVMs all running on a single system. Additionally, different types of application servers may be configured to transition to operating in a low-memory state based on different low-memory threshold amounts. Examples of different types of application servers include a job server configured to schedule and managing background program execution of jobs (e.g., non-real-time processing of jobs such as batch processing), an application programming interface (API) server configured to manage and provide a set of APIs, a cloud application server configured to serve one or more cloud applications to tenants in a cloud computing environment, etc. Also, FIGS. 1-6 show a non-memory storage that is part of a system. One of ordinary skill in the art will understand that the non-memory storage may be external to the system in some embodiments.

Figure 7:
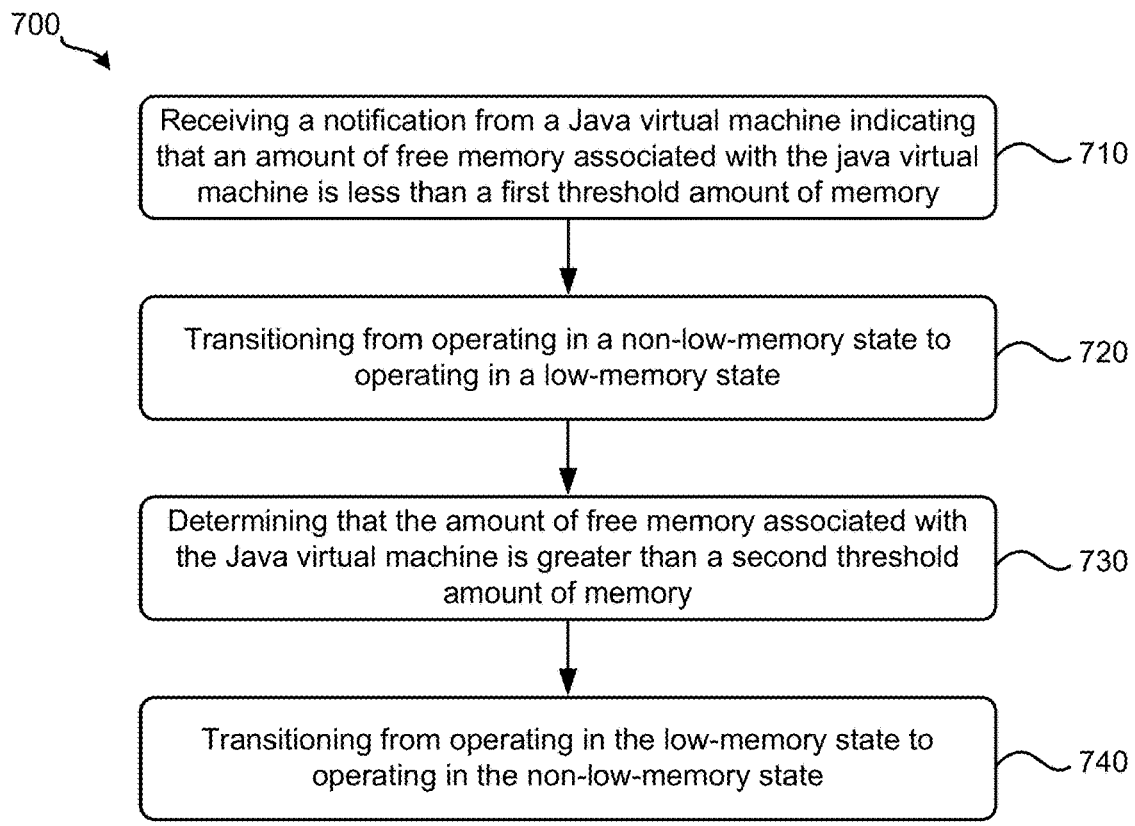
FIG. 7 illustrates a process for managing memory according to some embodiments.

FIG. 7 illustrates a process 700 for managing memory according to some embodiments. In some embodiments, application server 105 performs process 700. Process 700 starts by receiving, at 710, a notification from a Java virtual machine indicating that an amount of free memory associated with the java virtual machine is less than a first threshold amount of memory. Referring to FIG. 2 as an example, memory manager 110 may receive notification 205 from JVM 120 when JVM 120 determines that the amount of free memory decreases below threshold amount 135. In response to the notification, memory manager 110 can send notifications to components 115 that have requested to be notified of changes to the operation state of application server 105, as shown in FIG. 3.

Next, process 700 transitions, at 720, from operating in a non-low-memory state to operating in a low-memory state. Referring to FIG. 4 as an example, transitioning from operating in the non-low-memory state to operating in the low-memory state may include decreasing the amount of memory usage by one or more components 115a-n. As shown in FIG. 4, components 115b and 115n decrease the amount of memory usage by writing data from memory to non-memory storage 130 and then returning the memory to JVM 120. While operating in the low-memory state, memory manager 110 may periodically send JVM 120 requests for the amount of free memory, as also shown in FIG. 4.

Process 700 then determines, at 730, that the amount of free memory associated with the Java virtual machine is greater than a second threshold amount of memory. Referring to FIG. 5 as an example, memory manager 110 determined that the amount of free memory has increased above threshold 140. In response to the determination, memory manager 110 determines that application server 105 is to operate in the non-low-memory state and, thus, sends components 115b and 115n notifications indicating so, as illustrated in FIG. 5.

Finally, process 700 transitions, at 740, from operating in the low-memory state to operating in the non-low-memory state. Referring to FIG. 6 as an example, components 115b and 115n transitions from operating in the low-memory state to operating in the non-low-memory state by retrieving data from non-memory storage 130 that components 115b and 115n had written to non-memory storage 130 in FIG. 4. Then, components 115b and 115n may store the retrieved data in free memory requested from JVM 120.

Figure 8:
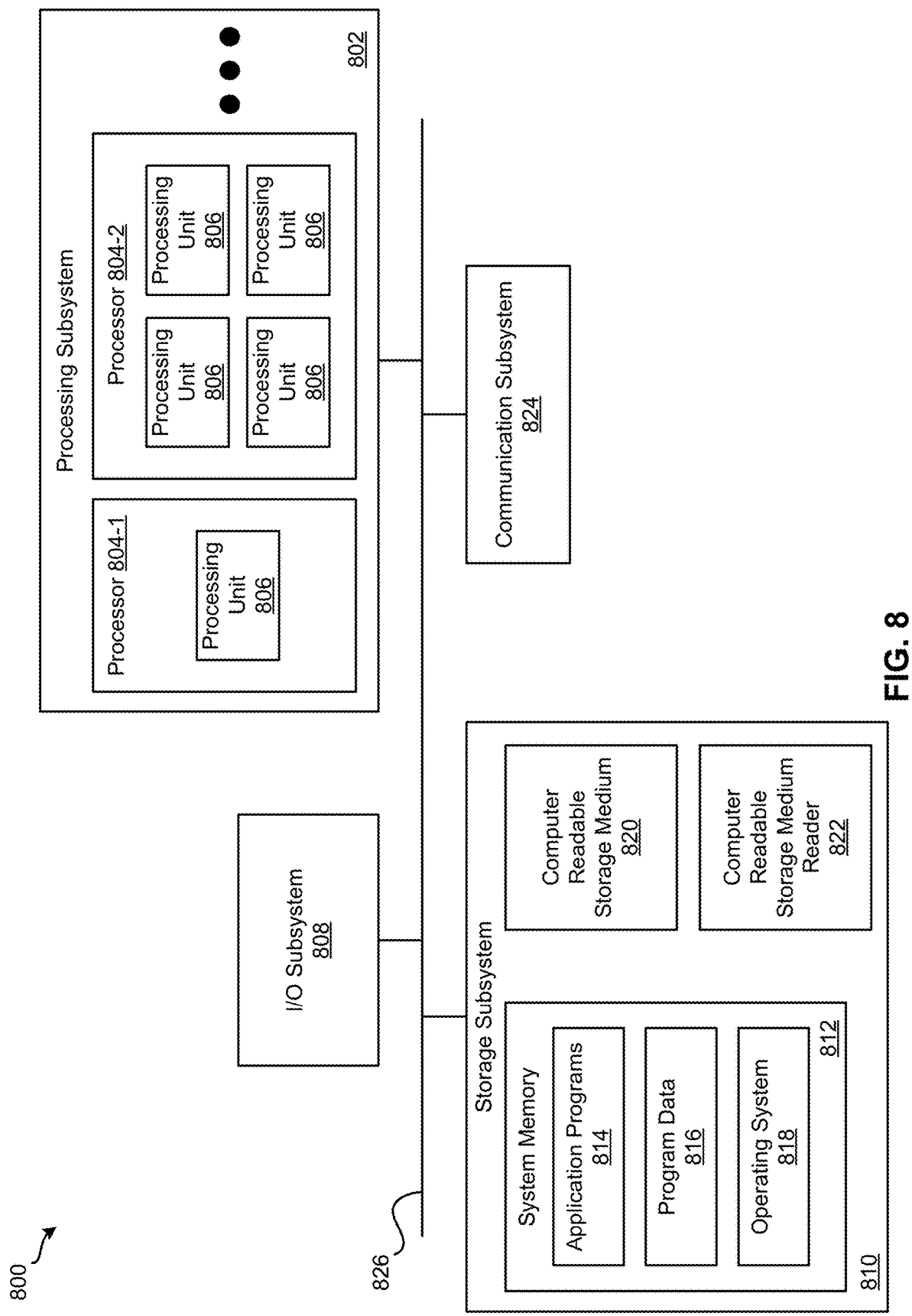
FIG. 8 illustrates an exemplary computer system, in which various embodiments may be implemented.

FIG. 8 illustrates an exemplary computer system 800 for implementing various embodiments described above. For example, computer system 800 may be used to implement system 100. Computer system 800 may be a desktop computer, a laptop, a server computer, or any other type of computer system or combination thereof. Some or all elements of application server 105, memory manager 110, components 115a-n, JVM 120, and memory pool 125, or combinations thereof can be included or implemented in computer system 800. In addition, computer system 800 can implement many of the operations, methods, and/or processes described above (e.g., process 700). As shown in FIG. 8, computer system 800 includes processing subsystem 802, which communicates, via bus subsystem 826, with input/output (I/O) subsystem 808, storage subsystem 810 and communication subsystem 824.

Bus subsystem 826 is configured to facilitate communication among the various components and subsystems of computer system 800. While bus subsystem 826 is illustrated in FIG. 8 as a single bus, one of ordinary skill in the art will understand that bus subsystem 826 may be implemented as multiple buses. Bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 802, which can be implemented as one or more integrated circuits (e.g., a conventional microprocessor or microcontroller), controls the operation of computer system 800. Processing subsystem 802 may include one or more processors 804. Each processor 804 may include one processing unit 806 (e.g., a single core processor such as processor 804-1) or several processing units 806 (e.g., a multicore processor such as processor 804-2). In some embodiments, processors 804 of processing subsystem 802 may be implemented as independent processors while, in other embodiments, processors 804 of processing subsystem 802 may be implemented as multiple processors integrate into a single chip or multiple chips. Still, in some embodiments, processors 804 of processing subsystem 802 may be implemented as a combination of independent processors and multiple processors integrated into a single chip or multiple chips.

In some embodiments, processing subsystem 802 can execute a variety of programs or processes in response to program code and can maintain multiple concurrently executing programs or processes. At any given time, some or all of the program code to be executed can reside in processing subsystem 802 and/or in storage subsystem 810. Through suitable programming, processing subsystem 802 can provide various functionalities, such as the functionalities described above by reference to process 700, etc.

I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 800 to a user or another device (e.g., a printer).

As illustrated in FIG. 8, storage subsystem 810 includes system memory 812, computer-readable storage medium 820, and computer-readable storage medium reader 822. System memory 812 may be configured to store software in the form of program instructions that are loadable and executable by processing subsystem 802 as well as data generated during the execution of program instructions. In some embodiments, system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 812 may include different types of memory, such as static random access memory (SRAM) and/or dynamic random access memory (DRAM). System memory 812 may include a basic input/output system (BIOS), in some embodiments, that is configured to store basic routines to facilitate transferring information between elements within computer system 800 (e.g., during start-up). Such a BIOS may be stored in ROM (e.g., a ROM chip), flash memory, or any other type of memory that may be configured to store the BIOS.

As shown in FIG. 8, system memory 812 includes application programs 814 (e.g., application server 85 and JVM 120), program data 816, and operating system (OS) 818. OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 820 may be a non-transitory computer-readable medium configured to store software (e.g., programs, code modules, data constructs, instructions, etc.). Many of the components (e.g., application server 105, memory manager 110, components 115a-n, JVM 120, and memory pool 125) and/or processes (e.g., process 700) described above may be implemented as software that when executed by a processor or processing unit (e.g., a processor or processing unit of processing subsystem 802) performs the operations of such components and/or processes. Storage subsystem 810 may also store data used for, or generated during, the execution of the software.

Storage subsystem 810 may also include computer-readable storage medium reader 822 that is configured to communicate with computer-readable storage medium 820. Together and, optionally, in combination with system memory 812, computer-readable storage medium 820 may comprehensively represent remote, local, fixed, and/or removable storage devices plus storage media for temporarily and/or more permanently containing, storing, transmitting, and retrieving computer-readable information.

Computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 824 serves as an interface for receiving data from, and transmitting data to, other devices, computer systems, and networks. For example, communication subsystem 824 may allow computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 824 may provide components configured for wired communication (e.g., Ethernet) in addition to or instead of components configured for wireless communication.

One of ordinary skill in the art will realize that the architecture shown in FIG. 8 is only an example architecture of computer system 800, and that computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
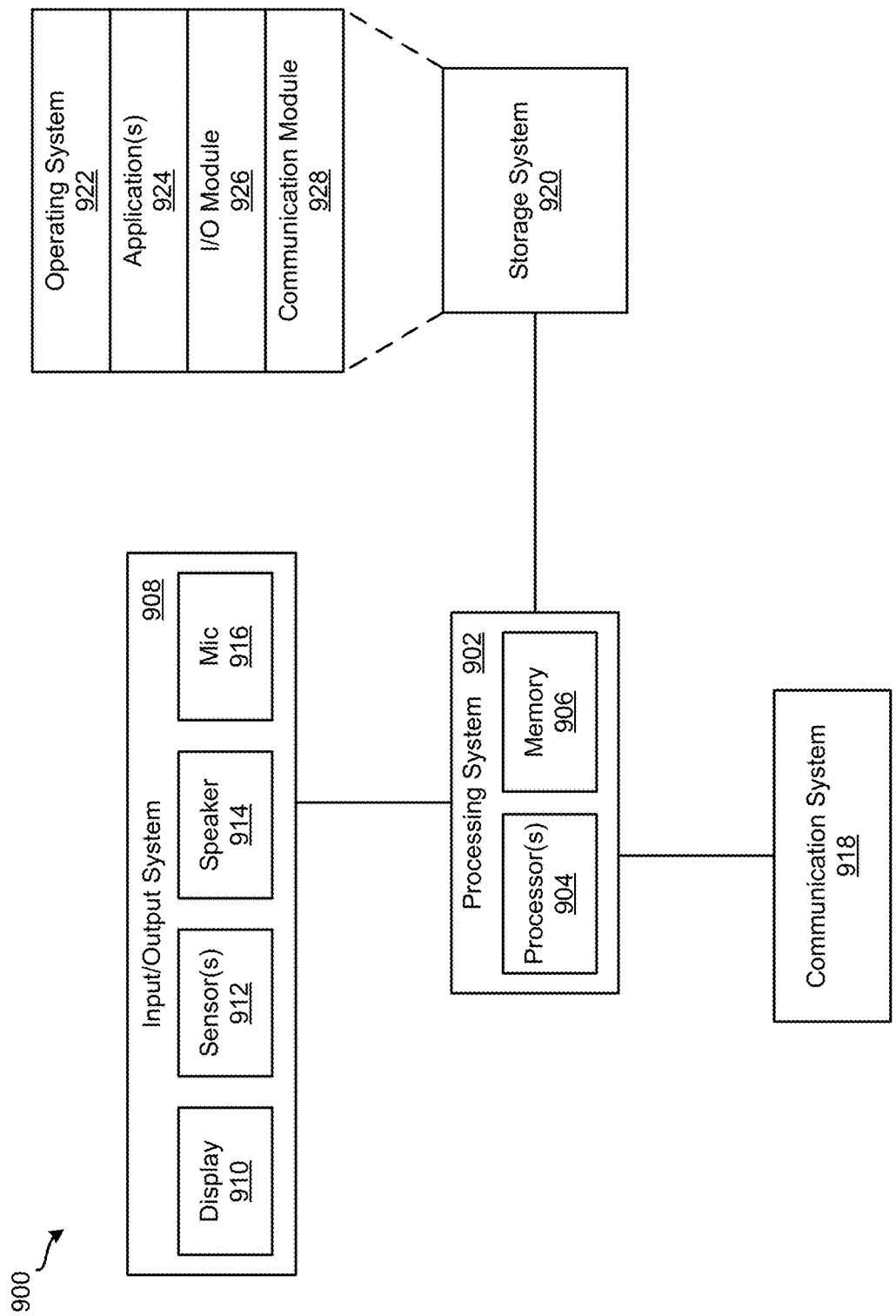
FIG. 9 illustrates an exemplary computing device, in which various embodiments may be implemented.

FIG. 9 illustrates an exemplary computing device 900 for implementing various embodiments described above. For example, computing device 900 may be used to implement system 100. Computing device 900 may be a cellphone, a smartphone, a wearable device, an activity tracker or manager, a tablet, a personal digital assistant (PDA), a media player, or any other type of mobile computing device or combination thereof. Some or all elements of application server 105, memory manager 110, components 115*a-n*, JVM 120, and memory pool 125, or combinations thereof can be included or implemented in computing device 900. In addition, computing device 900 can implement many of the operations, methods, and/or processes described above (e.g., process 700). As shown in FIG. 9, computing device 900 includes processing system 902, input/output (I/O) system 908, communication system 918, and storage system 920. These components may be coupled by one or more communication buses or signal lines.

Processing system 902, which can be implemented as one or more integrated circuits (e.g., a conventional microprocessor or microcontroller), controls the operation of computing device 900. As shown, processing system 902 includes one or more processors 904 and memory 906. Processors 904 are configured to run or execute various software and/or sets of instructions stored in memory 906 to perform various functions for computing device 900 and to process data.

Each processor of processors 904 may include one processing unit (e.g., a single core processor) or several processing units (e.g., a multicore processor). In some embodiments, processors 904 of processing system 902 may be implemented as independent processors while, in other embodiments, processors 904 of processing system 902 may be implemented as multiple processors integrate into a single chip. Still, in some embodiments, processors 904 of processing system 902 may be implemented as a combination of independent processors and multiple processors integrated into a single chip.

Memory 906 may be configured to receive and store software (e.g., operating system 922, applications 924, I/O module 926, communication module 928, etc. from storage system 920) in the form of program instructions that are loadable and executable by processors 904 as well as data generated during the execution of program instructions. In some embodiments, memory 906 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 908 is responsible for receiving input through various components and providing output through various components. As shown for this example, I/O system 908 includes display 910, one or more sensors 912, speaker 914, and microphone 916. Display 910 is configured to output visual information (e.g., a graphical user interface (GUI) generated and/or rendered by processors 904). In some embodiments, display 910 is a touch screen that is configured to also receive touch-based input. Display 910 may be implemented using liquid crystal display (LCD) technology, light-emitting diode (LED) technology, organic LED (OLED) technology, organic electro luminescence (OEL) technology, or any other type of display technologies. Sensors 912 may include any number of different types of sensors for measuring a physical quantity (e.g., temperature, force, pressure, acceleration, orientation, light, radiation, etc.). Speaker 914 is configured to output audio information and microphone 916 is configured to receive audio input. One of ordinary skill in the art will appreciate that I/O system 908 may include any number of additional, fewer, and/or different components. For instance, I/O system 908 may include a keypad or keyboard for receiving input, a port for transmitting data, receiving data and/or power, and/or communicating with another device or component, an image capture component for capturing photos and/or videos, etc.

Communication system 918 serves as an interface for receiving data from, and transmitting data to, other devices, computer systems, and networks. For example, communication system 918 may allow computing device 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 918 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 918 may provide components configured for wired communication (e.g., Ethernet) in addition to or instead of components configured for wireless communication.

Storage system 920 handles the storage and management of data for computing device 900. Storage system 920 may be implemented by one or more non-transitory machine-readable mediums that are configured to store software (e.g., programs, code modules, data constructs, instructions, etc.) and store data used for, or generated during, the execution of the software. Many of the components (e.g., application server 105, memory manager 110, components 115*a-n*, JVM 120, and memory pool 125) and/or processes (e.g., process 700) described above may be implemented as software that when executed by a processor or processing unit (e.g., processors 904 of processing system 902) performs the operations of such components and/or processes.

In this example, storage system 920 includes operating system 922, one or more applications 924, I/O module 926, and communication module 928. Operating system 922 includes various procedures, sets of instructions, software components and/or drivers for controlling and managing general system tasks (e.g., memory management, storage device control, power management, etc.) and facilitates communication between various hardware and software components. Operating system 922 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 924 can include any number of different applications installed on computing device 900. For example, application server 105 and JVM 120 may be installed on computing device 900. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 926 manages information received via input components (e.g., display 910, sensors 912, and microphone 916) and information to be outputted via output components (e.g., display 910 and speaker 914). Communication module 928 facilitates communication with other devices via communication system 918 and includes various software components for handling data received from communication system 918.

One of ordinary skill in the art will realize that the architecture shown in FIG. 9 is only an example architecture of computing device 900, and that computing device 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
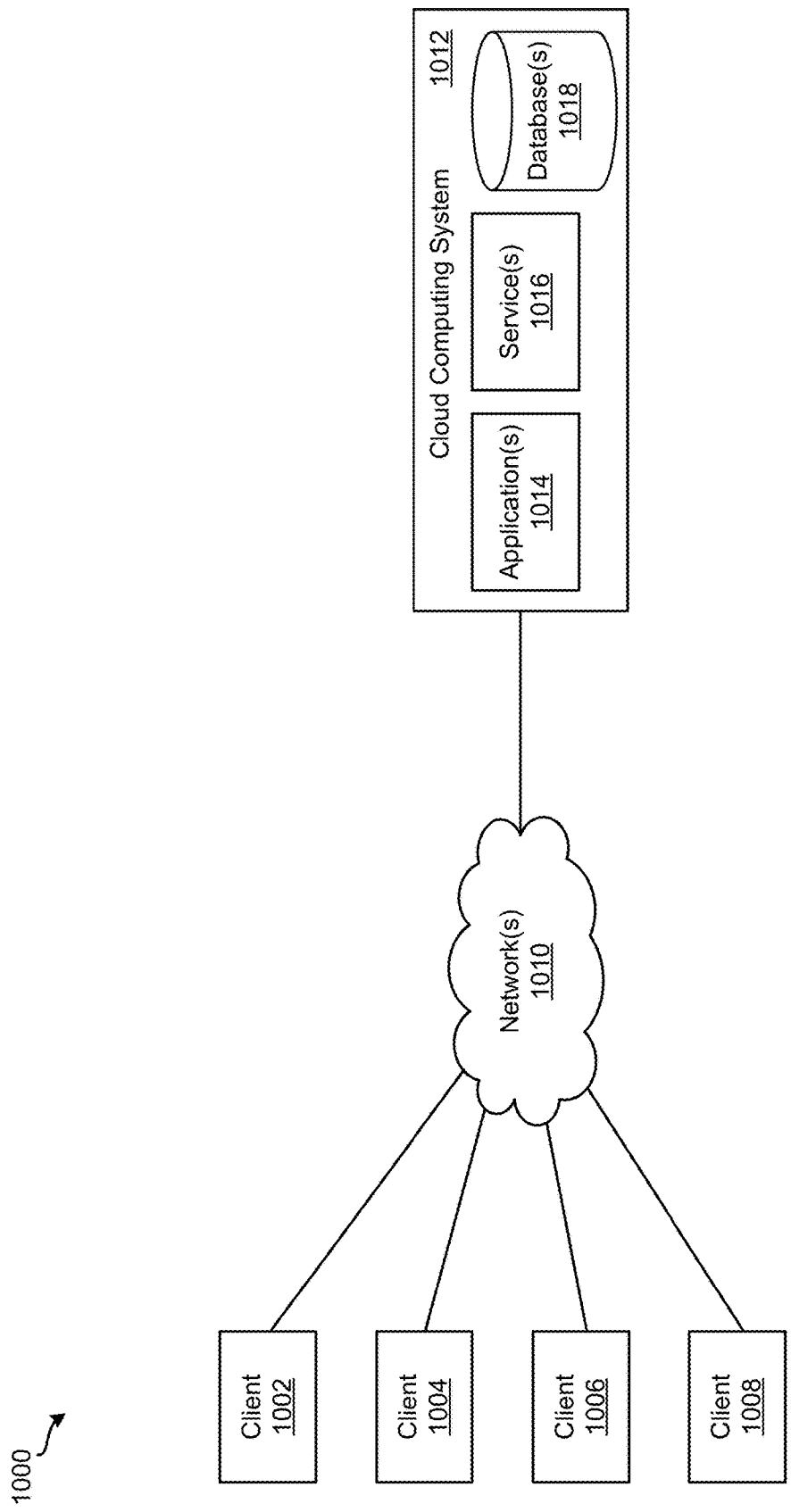
FIG. 10 illustrates system for implementing various embodiments described above.

FIG. 10 illustrates an exemplary system 1000 for implementing various embodiments described above. For example, cloud computing system 1012 of system 1000 may be used to implement system 100. As shown, system 1000 includes client devices 1002-1008, one or more networks 1010, and cloud computing system 1012. Cloud computing system 1012 is configured to provide resources and data to client devices 1002-1008 via networks 1010. In some embodiments, cloud computing system 1000 provides resources to any number of different users (e.g., customers, tenants, organizations, etc.). Cloud computing system 1012 may be implemented by one or more computer systems (e.g., servers), virtual machines operating on a computer system, or a combination thereof.

As shown, cloud computing system 1012 includes one or more applications 1014, one or more services 1016, and one or more databases 1018. Cloud computing system 1000 may provide applications 1014, services 1016, and databases 1018 to any number of different customers in a self-service, subscription-based, elastically scalable, reliable, highly available, and secure manner.

In some embodiments, cloud computing system 1000 may be adapted to automatically provision, manage, and track a customer's subscriptions to services offered by cloud computing system 1000. Cloud computing system 1000 may provide cloud services via different deployment models. For example, cloud services may be provided under a public cloud model in which cloud computing system 1000 is owned by an organization selling cloud services and the cloud services are made available to the general public or different industry enterprises. As another example, cloud services may be provided under a private cloud model in which cloud computing system 1000 is operated solely for a single organization and may provide cloud services for one or more entities within the organization. The cloud services may also be provided under a community cloud model in which cloud computing system 1000 and the cloud services provided by cloud computing system 1000 are shared by several organizations in a related community. The cloud services may also be provided under a hybrid cloud model, which is a combination of two or more of the aforementioned different models.

In some instances, any one of applications 1014, services 1016, and databases 1018 made available to client devices 1002-1008 via networks 1010 from cloud computing system 1000 is referred to as a "cloud service." Typically, servers and systems that make up cloud computing system 1000 are different from the on-premises servers and systems of a customer. For example, cloud computing system 1000 may host an application and a user of one of client devices 1002-1008 may order and use the application via networks 1010.

Applications 1014 may include software applications that are configured to execute on cloud computing system 1012 (e.g., a computer system or a virtual machine operating on a computer system) and be accessed, controlled, managed, etc. via client devices 1002-1008. In some embodiments, applications 1014 may include server applications and/or mid-tier applications (e.g., HTTP (hypertext transport protocol) server applications, FTP (file transfer protocol) server applications, CGI (common gateway interface) server applications, JAVA server applications, etc.). Services 1016 are software components, modules, application, etc. that are configured to execute on cloud computing system 1012 and provide functionalities to client devices 1002-1008 via networks 1010. Services 1016 may be web-based services or on-demand cloud services.

Databases 1018 are configured to store and/or manage data that is accessed by applications 1014, services 1016, and/or client devices 1002-1008. For instance, storage 130 may be stored in databases 1018. Databases 1018 may reside on a non-transitory storage medium local to (and/or resident in) cloud computing system 1012, in a storage-area network (SAN), on a non-transitory storage medium local located remotely from cloud computing system 1012. In some embodiments, databases 1018 may include relational databases that are managed by a relational database management system (RDBMS). Databases 1018 may be a column-oriented databases, row-oriented databases, or a combination thereof. In some embodiments, some or all of databases 1018 are in-memory databases. That is, in some such embodiments, data for databases 1018 are stored and managed in memory (e.g., random access memory (RAM)).

Client devices 1002-1008 are configured to execute and operate a client application (e.g., a web browser, a proprietary client application, etc.) that communicates with applications 1014, services 1016, and/or databases 1018 via networks 1010. This way, client devices 1002-1008 may access the various functionalities provided by applications 1014, services 1016, and databases 1018 while applications 1014, services 1016, and databases 1018 are operating (e.g., hosted) on cloud computing system 1000. Client devices 1002-1008 may be computer system 800 or computing device 900, as described above by reference to FIGS. 8 and 9, respectively. Although system 1000 is shown with four client devices, any number of client devices may be supported.

Networks 1010 may be any type of network configured to facilitate data communications among client devices 1002-1008 and cloud computing system 1012 using any of a variety of network protocols. Networks 1010 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving a notification from a java virtual machine indicating that an amount of free memory associated with the java virtual machine is less than a first threshold amount of memory;
   in response to the notification, transitioning from operating in a non-low-memory stat to operating a low-memory state, wherein the low-memory state comprises decreasing an amount of memory used by a set of components in a plurality of components of an application operating on the java virtual machine in order to increase the amount of free memory associated with the java virtual machine, wherein decreasing the amount of memory used by the set of components comprises writing data stored in memory used by the set of components to a secondary storage and returning the memory used by the set of components to the java virtual machine;
   determining that the amount of free memory associated with the java virtual machine is greater than a second threshold amount of memory; and
   in response to the determination, transitioning from operating in the low-memory state to operating in the non-low-memory state by requesting free memory from the java virtual machine, retrieving the data stored in the secondary storage, and writing the data to the requested free memory.

2. The non-transitory machine-readable medium of claim 1, wherein the program further comprises a set of instructions for sending the java virtual machine a request to receive the notification when the java virtual machine detects that amount of free memory associated with the java virtual machine is less than the first threshold amount of memory.

3. The non-transitory machine-readable medium of claim 1, wherein the low-memory state further comprises periodically polling the java virtual machine for the amount of free memory associated with the java virtual machine.

4. The non-transitory machine-readable medium of claim 1, wherein operating in the non-low-memory state comprises sending the java virtual machine requests for free memory for the plurality of components to use to store data.

5. The non-transitory machine-readable medium of claim 1, wherein the second threshold amount is based on the first threshold amount.

6. The non-transitory machine-readable medium of claim 1, wherein free memory associated with the java virtual machine is implemented as a memory pool managed by the java virtual machine.

7. The non-transitory machine-readable medium of claim 6, wherein the memory pool comprises memory allocated from a memory of the device.

8. A method, executable by a device, comprising:
   receiving a notification from a java virtual machine indicating that an amount of free memory associated with the java virtual machine is less than a first threshold amount of memory;
   in response to the notification, transitioning from operating in a non-low-memory stat to operating a low-memory state, wherein the low-memory state comprises decreasing an amount of memory used by a set of components in a plurality of components of an application operating on the java virtual machine in order to increase the amount of free memory associated with the java virtual machine, wherein decreasing the amount of memory used by the set of components comprises writing data stored in memory used by the set of components to a secondary storage and returning the memory used by the set of components to the java virtual machine;
   determining that the amount of free memory associated with the java virtual machine is greater than a second threshold amount of memory; and
   in response to the determination, transitioning from operating in the low-memory state to operating in the non-low-memory state by requesting free memory from the java virtual machine, retrieving the data stored in the secondary storage, and writing the data to the requested free memory.

9. The method of claim 8 further comprising sending the java virtual machine a request to receive the notification when the java virtual machine detects that amount of free memory associated with the java virtual machine is less than the first threshold amount of memory.

10. The method of claim 8, wherein the low-memory state further comprises periodically polling the java virtual machine for the amount of free memory associated with the java virtual machine.

11. The method of claim 8, wherein operating in the non-low-memory state comprises sending the java virtual machine requests for free memory for the plurality of components to use to store data.

12. The method of claim 8, wherein the second threshold amount is based on the first threshold amount.

13. The method of claim 8, wherein free memory associated with the java virtual machine is implemented as a memory pool managed by the java virtual machine.

14. The method of claim 13, wherein the memory pool comprises memory allocated from a memory of the device.

15. A system comprising:
   a set of processing units; and
   a non-transitory computer-readable medium storing instructions that when executed by at least one processing unit in the set of processing units cause the at least one processing unit to:

receive a notification from a java virtual machine indicating that an amount of free memory associated with the java virtual machine is less than a first threshold amount of memory;

in response to the notification, transition from operating in a non-low-memory stat to operating a low-memory state, wherein the low-memory state comprises decreasing an amount of memory used by a set of components in a plurality of components of an application operating on the java virtual machine in order to increase the amount of free memory associated with the java virtual machine, wherein decreasing the amount of memory used by the set of components comprises writing data stored in memory used by the set of components to a secondary storage and returning the memory used by the set of components to the java virtual machine;

determine that the amount of free memory associated with the java virtual machine is greater than a second threshold amount of memory; and in response to the determination, transition from operating in the low-memory state to operating in the non-low-memory state by requesting free memory from the java virtual machine, retrieving the data stored in the secondary storage, and writing the data to the requested free memory.

16. The system of claim 15, wherein the instructions further cause the at least one processing unit to send the java virtual machine a request to receive the notification when the java virtual machine detects that amount of free memory associated with the java virtual machine is less than the first threshold amount of memory.

17. The system of claim 15, wherein the low-memory state further comprises periodically polling the java virtual machine for the amount of free memory associated with the java virtual machine.

18. The system of claim 15, wherein operating in the non-low-memory state comprises sending the java virtual machine requests for free memory for the plurality of components to use to store data.

19. The system of claim 15, wherein free memory associated with the java virtual machine is implemented as a memory pool managed by the java virtual machine.

20. The system of claim 19, wherein the memory pool comprises memory allocated from a memory of the system.

* * * * *